United States Patent
Armstrong

(10) Patent No.: US 11,694,858 B2
(45) Date of Patent: Jul. 4, 2023

(54) REMOTE CONTROL COVER ASSEMBLY

(71) Applicant: Kimberly M. Armstrong, Baltimore, MD (US)

(72) Inventor: Kimberly M. Armstrong, Baltimore, MD (US)

( * ) Notice: Subject to any disclaimer, the term of this patent is extended or adjusted under 35 U.S.C. 154(b) by 101 days.

(21) Appl. No.: 17/317,603

(22) Filed: May 11, 2021

(65) Prior Publication Data

US 2021/0366668 A1 Nov. 25, 2021

Related U.S. Application Data

(60) Provisional application No. 63/027,214, filed on May 19, 2020.

(51) Int. Cl.
| | |
|---|---|
| *H01H 9/02* | (2006.01) |
| *H04N 21/422* | (2011.01) |
| *F21V 33/00* | (2006.01) |
| *G06K 19/07* | (2006.01) |
| *F21Y 115/10* | (2016.01) |
| *G08B 21/24* | (2006.01) |

(52) U.S. Cl.
CPC ....... *H01H 9/0242* (2013.01); *F21V 33/0052* (2013.01); *G06K 19/0727* (2013.01); *H04N 21/42222* (2013.01); *F21Y 2115/10* (2016.08); *G08B 21/24* (2013.01)

(58) Field of Classification Search
CPC ... H01H 9/0242; F21V 33/0052; F21V 33/00; F21V 33/0004; G06K 19/0727; H04N 21/42222; F21Y 2115/10; G08B 21/24
See application file for complete search history.

(56) References Cited

U.S. PATENT DOCUMENTS

| | | | | |
|---|---|---|---|---|
| 5,188,448 A | * | 2/1993 | Siriani | F21V 33/0052 362/85 |
| 5,388,692 A | * | 2/1995 | Withrow | F21V 33/0052 362/85 |
| 5,564,814 A | * | 10/1996 | Anderson | F21V 33/0052 362/183 |
| 5,648,757 A | * | 7/1997 | Vernace | H01H 9/0242 340/568.1 |
| 6,573,832 B1 | | 6/2003 | Fugere-Ramirez | |
| 6,772,881 B2 | | 8/2004 | Le et al. | |
| 7,064,663 B2 | | 6/2006 | Pucci et al. | |
| 7,290,654 B2 | | 11/2007 | Hodges | |

(Continued)

*Primary Examiner* — Bao Q Truong
(74) *Attorney, Agent, or Firm* — Foley & Lardner LLP

(57) ABSTRACT

A cover assembly includes a main body, a closure member, gripping portions, and an identification tag. The main body defines an interior to receive a remote control and includes top, bottom, front, first and second side, and rear portions. The closure member is coupled to the rear portion and configured to move the rear portion between an open position, where a remote control is insertable into and removable from the interior, and a closed position, where the closure member is coupled to the bottom portion to secure the remote control within the interior. The multiple gripping portions are provided on the first and second side portions and configured to facilitate gripping of the cover assembly by a user. The identification tag includes a processor and is configured to communicate with an external device and operate to increase a conspicuity of the cover assembly for locating the cover assembly.

19 Claims, 3 Drawing Sheets

(56) References Cited

U.S. PATENT DOCUMENTS 8,672,127 B1 * 3/2014 Clover ............ H04N 21/42204
206/320
2008/0121541 A1 5/2008 Clark

* cited by examiner

REMOTE CONTROL COVER ASSEMBLY

CROSS-REFERENCE TO RELATED PATENT APPLICATION

This application claims the benefit of and priority to U.S. Provisional Application No. 63/027,214, filed May 19, 2020, the entire disclosure of which is incorporated by reference herein.

BACKGROUND

The present disclosure relates generally to the field of cover assemblies for remote controls. More specifically, the present disclosure relates to remote control cover assemblies made of a flexible, stretchable and/or transparent or partially transparent material and having a closure flap, visibility strips, an identification/locating feature, gripping features, and other features described herein.

SUMMARY

One embodiment of the present disclosure relates to a cover assembly. The cover assembly includes a main body, a closure member, multiple gripping portions, and an identification tag. The main body defines an interior configured to receive a remote control and includes a top portion, a bottom portion, a front portion, a first side portion, a second side portion, and a rear portion. The closure member is coupled to the rear portion and configured to enable a user to move the rear portion between an open position, where a remote control is insertable into and removable from the interior, and a closed position, where the closure member is coupled to the bottom portion to secure the remote control within the interior. The multiple gripping portions are provided on the first and second side portions and configured to facilitate gripping of the cover assembly by a user. The identification tag includes a processor coupled to the main body. The identification tag is configured to communicate with an external device and operate to increase a conspicuity of the cover assembly for locating the cover assembly.

Another embodiment of the present disclosure relates to a cover assembly. The cover assembly includes a main body, a closure member, and at least one of a visual indicator or an aural indicator. The main body defines an interior configured to receive a remote control. The closure member is coupled to a rear portion of the main body and is configured to transition the cover assembly between an open position, where a remote control is insertable into and removable from the interior, and a closed position to secure the remote control within the interior. The visual indicator or the aural indicator are positioned on the cover assembly and are configured to increase a visual or aural conspicuity of the cover assembly for locating the cover assembly.

Another embodiment of the present disclosure relates to a cover assembly. The cover assembly includes a main body, a microphone, a speaker, and a processor. The main body defines an interior configured to receive a remote control. The microphone is configured to capture audio of an aural event produced by a user. The speaker is configured to provide a sound with an adjustable aural characteristic. The processor is configured to detect the aural event based on an input from the microphone, and wirelessly communicate with an external device, the wireless communication indicating a relative distance between the external device and the cover assembly. The processor is also configured to operate the speaker to provide the sound according to the adjustable aural characteristic. In some embodiments, the adjustable aural characteristic is adjusted in real-time by the processor based on the wireless communication to aurally notify a user regarding the relative distance between the external device and the cover assembly for locating the cover assembly.

Another embodiment of the present disclosure relates to a cover assembly. The cover assembly includes a main body, a closure member, multiple gripping portions, and at least one visibility strip of phosphorescent material. The main body defines an interior configured to receive a remote control and includes a top portion, a bottom portion, a front portion, a first side portion, a second side portion, and a rear portion. The closure member is coupled to the rear portion and is configured to move between an open position, where the remote control is insertable into and removable from the interior, and a closed position, where the closure member is coupled to the bottom portion to secure the remote control within the interior. The closure member includes a first end integrally formed with the rear portion, a free end, and a fastener at the free end for fastening the free end in the closed position. The multiple gripping portions are provided on the first and second side portions and are configured to facilitate gripping of the cover assembly by a user. The at least one visibility strip of phosphorescent material is configured to provide a glow in low light conditions to facilitate locating the cover assembly. The at least one visibility strip extends in a parallel direction along at least one of the top portion, the bottom portion, the first side portion, or the second side portion of the main body. The main body and the closure member are an elastic material configured to stretch to accommodate different sized remote controls. The main body includes one or more transparent portions configured to overlay at least one of buttons or a display screen of the remote control.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Before discussing further details of the cover and/or the components thereof, it should be noted that references to "front," "back," "rear," "upward," "downward," "inner," "outer," "right," and "left" in this description are merely used to identify the various elements as they are oriented in the Figures. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Referring to the Figures generally, various embodiments disclosed herein relate to a cover assembly for a remote control. The cover assembly may include various features not found in conventional remote controls or remote control covers, such as a closure flap with snap fastener or other closure mechanism, transparent, stretchable, and/or flexible cover material, visibility strips (e.g., neon or glow strips), finger grooves formed in portions of the cover assembly, and an identification tag or module for facilitating locating a lost or misplaced remote control.

Figure 1:
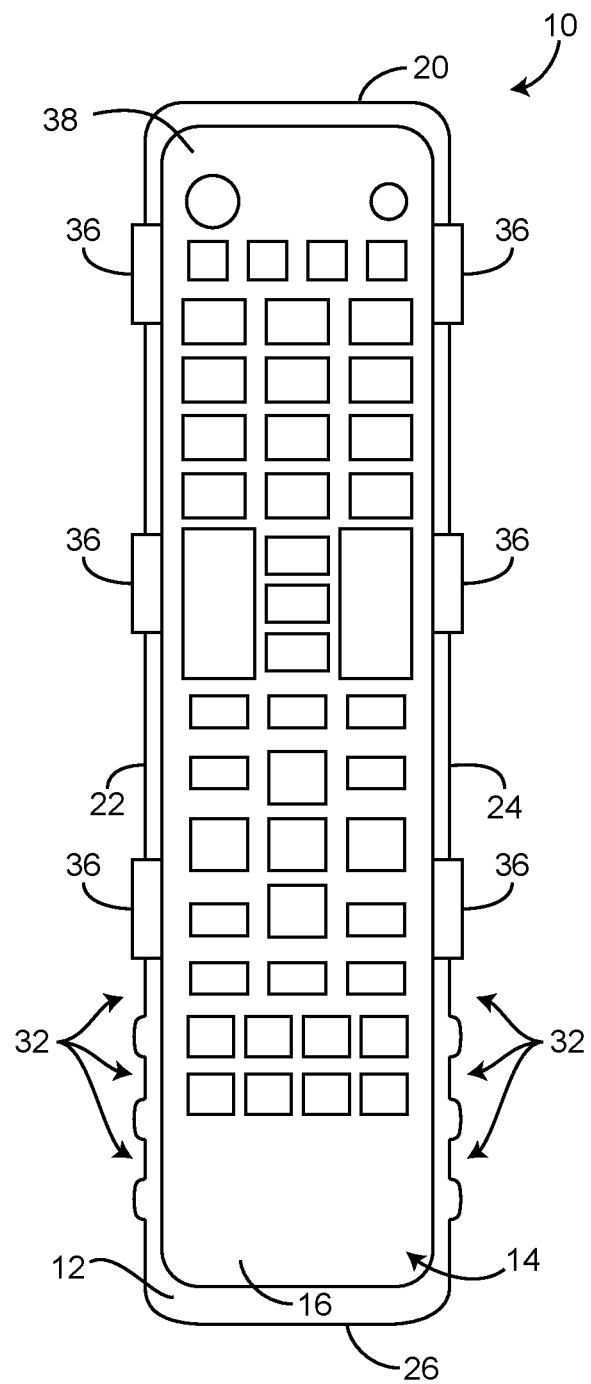
FIG. 1 is a front view of a cover assembly for a remote control shown fitted over a remote control according to one embodiment.
Figure 2:
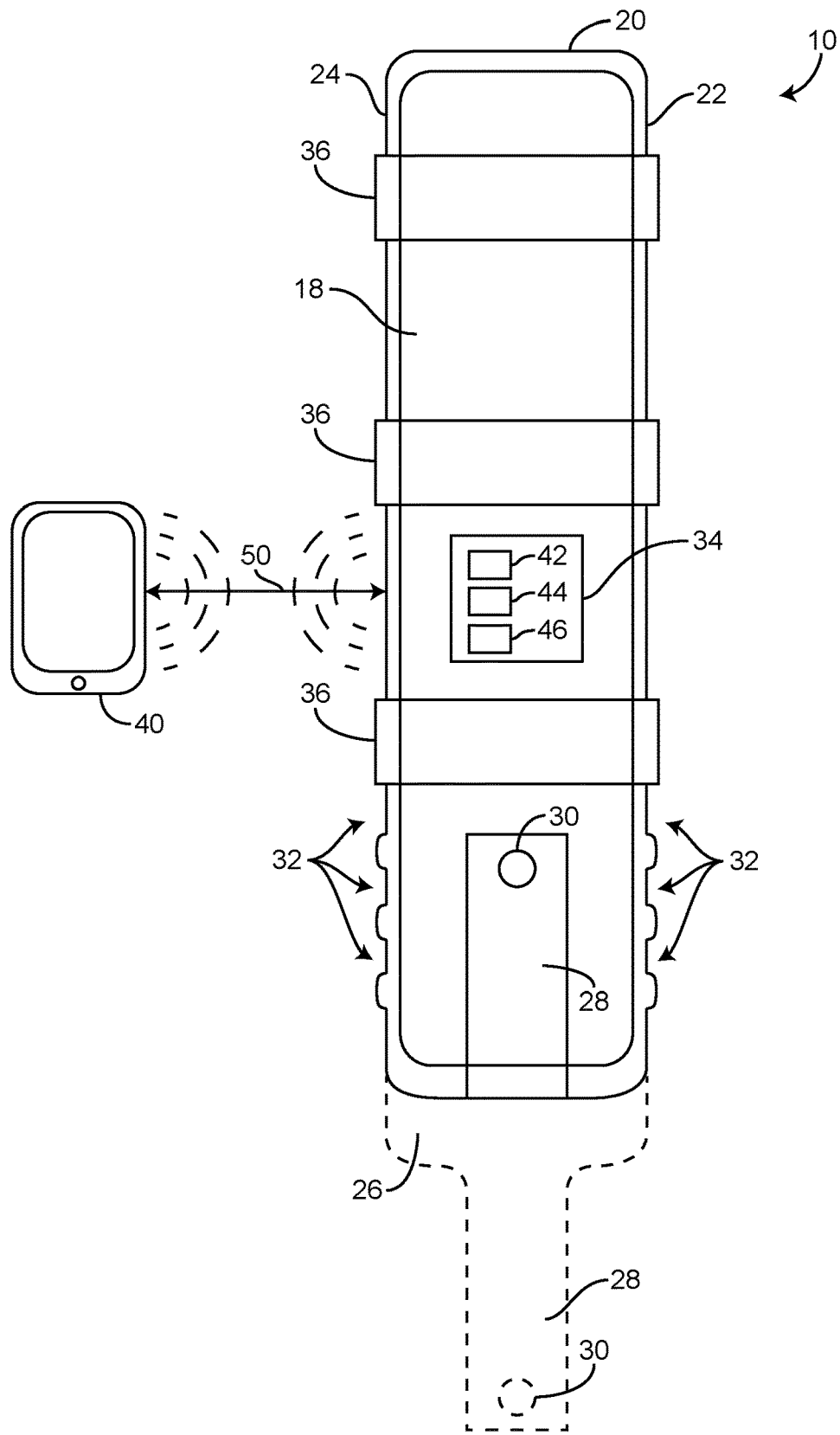
FIG. 2 is a rear view of the cover assembly of FIG. 1 according to one embodiment.

Referring now to FIGS. 1 and 2, a cover assembly is shown according to one embodiment as cover assembly 10. Cover assembly 10 is usable to receive a remote control (e.g., a television remote, DVD/DVR remote, a smart-TV remote, a control device, a control unit, etc.), but may find use in other applications (e.g., to receive and protect other portable, handheld, and/or electronic devices), all of which are understood to be within the scope of the present disclosure. Cover assembly 10 includes a main body 12 that defines an interior 14 configured to receive a remote control 38. Main body 12 substantially surrounds remote control 38 or surrounds at least a perimeter or outer periphery of remote control 38, and includes a top portion 16, bottom portion 18, front portion 20, first and second side portions 22, 24, and a rear portion 26. Portions 16-26 collectively define and enclose interior 14.

In some embodiments, portions 16-26 are integrally formed from a common material (e.g., using a molding, forming, or other process). In other embodiments, portions 16-26 may be individually formed and subsequently coupled together via one or more seams, joints, overlapping portions, etc. (e.g., using an appropriate joining technique such as ultrasonic welding, adhesives, etc.). Portions 16-26 may be sized and shaped such that main body 12 takes any appropriate configuration. For example, in some embodiments, main body 12 may be custom-sized for a particular size and shape of remote control. Alternatively, main body 12 may be generically-sized to accommodate a range of sizes and/or shapes of remote controls.

Main body 12 may be made of any suitable material. In some embodiments, main body 12 is made from a transparent, stretchable and/or elastic material. In some embodiments, all of main body 12 is transparent. In some embodiments, only some of the portions 16-26 are transparent or translucent, while other of the portions 16-26 are opaque. In some embodiments, for example, top portion 16 and bottom portion 18 are translucent or transparent while portions 20-26 are opaque. In other embodiments, all or portions of main body 12 may be rigid, semi-transparent or translucent, and/or non-stretchable. Transparent or semi-transparent portions may be provided where visibility of underlying controls, features, etc. of the remote control is desirable. For example, portions of main body 12 that overly buttons, on/off indicators, user interface screens, etc., may be made transparent. Flexibility and/or stretchability enables main body 12 to conform to the size and shape of a particular remote control. In some embodiments, main body 12 is made of a flexible polymer material. In other embodiments, main body 12 may be made up of combinations of differing materials. In some embodiments, main body 12 or portions of main body 12 is/are made from a material with antibacterial properties.

In some embodiments, main body 12 (or portions of main body 12) is configured with a textured surface. The textured surface may facilitate identification of the cover assembly 10 by touch (e.g., by a hand) during low visibility conditions. Any type of texture may be used, such as raised, grooved, patterned, bumpy, rough, and the like. The textured surface may be formed as part of the main body 12 (e.g., integrally molded) or individually formed and subsequently coupled together with the main body 12. For example, the main body 12 may include finger grooves 32 formed along sides of the main body 12. Grooves 32 may extend all or a part of the way between top portion 16 and bottom portion 18, and may take a semi-circular or other shape (e.g., irregular, etc.) to facilitate gripping of main body 12.

Referring particularly to FIG. 2, in one embodiment, a closure member 28 extends from rear portion 26. Closure member 28 may be integrally formed with or otherwise coupled to rear portion 26 at one end, and may take the form of a closure strap (e.g., having a relatively long, narrow shape). A free end of closure member 28 (e.g., opposite the end that is integrally formed or otherwise coupled with rear portion 26) includes a fastener 30 intended to secure closure member 28 in a closed position. One or more other portions of main body 12 (e.g., bottom portion 18), may include a complimentary fastener to facilitate securing closure member 28. Fastener 30 may be or include any suitable fastener, including mechanical fasteners (e.g., snaps, buttons, etc.), hook and loop fasteners, magnetic fasteners, and the like. In some embodiments, closure member 28 is stretchable/elastic to accommodate different sizes of remote controls. In some embodiments, remote control 38 can be slid into the cover assembly 10 through an opening defined at a rear of the cover assembly 10 when closure member 28 is transitioned into an open position. Once remote control 38 is positioned within the cover assembly 10, the closure member 28 can be transitioned into a closed position by wrapping the closure member 28 around an exposed end of the remote control 38, and securing the closure member 28 with the fastener 30.

As noted above, in some embodiments, all or portions of main body 12 may be transparent to enable viewing underlying features of remote control 38. For example, portions of main body 12 that overly buttons or display areas may be made transparent (e.g., all or a portion of top portion 16), while other portions of main body 12 may be opaque or semi-transparent (e.g., to include colored portions, graphics, etc., such as other portions of top portion 16 and/or all or portions of bottom portion 18). Furthermore, main body 12 may include stretchable portions to accommodate different sized remote controls and/or ensure a snug fit of main body 12 about remote control 38. Further yet, main body 12 may be made of a flexible material to facilitate a snug fit of main body 12 about remote control 38. Referring to FIG. 1, in some embodiments, all or a portion of top portion 16 are transparent. In further embodiments, all or portions of side portions 22, 24 are transparent (e.g., to accommodate side-mounted buttons, indicators, etc.).

Figure 3:
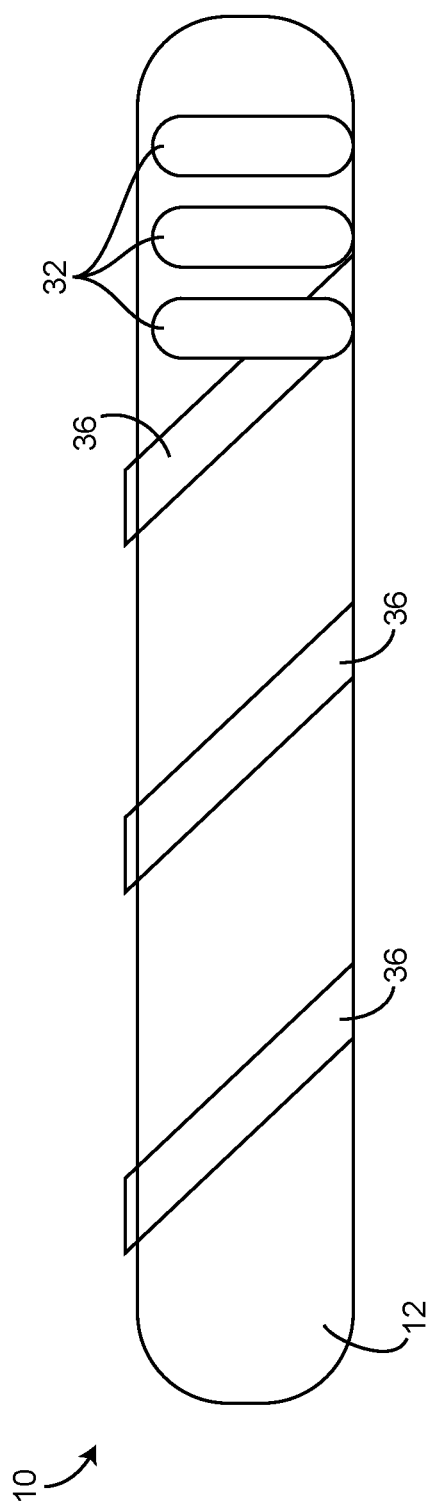
FIG. 3 is a side view of the cover assembly of FIG. 1 according to one embodiment.

In one embodiment, cover assembly 10 includes one or more visibility strips 36 (e.g., visibility members or portions, neon or glow strips or portions, etc.). The visibility strips 36 may facilitate identification of the cover assembly 10 in low lighting or visibility conditions. Visibility strips 36 may be bright colored (e.g., neon, etc.), have "glow-in-the-dark" properties (e.g., made of a phosphorescent material), or combinations thereof. For example, in one embodiment, visibility strips 36 extend across portions of main body 12. In one embodiment, visibility strips 36 extend generally parallel to each other across bottom portion 18 and/or side portions 22, 24. As shown in FIGS. 2-3, in some embodiments, visibility strips 36 may extend across bottom portion 18 in a direction generally transverse to the length of cover assembly 10, and extend at an angle between top and bottom portions 16, 18 (as shown, e.g., in FIG. 3).

In one embodiment, cover assembly 10 includes an identification tag 34. Identification tag 34 may be coupled to main body 12 and facilitate locating of cover assembly 10 by way of an external device 40 (e.g., a tag reader, a smartphone, a tablet, a wearable device, etc.). In some embodiments, tag 34 is adhered to a surface of main body 12. In other embodiments, tag 34 may be molded or formed into one or more portions of main body 12.

In some embodiments, identification tag 34 includes a microchip, processor, or processing circuit coupled to at least one antenna. In this regard, tag 34 may generally be configured for wireless communication via one or more antennas. Embodiments may be configured with any suitable form of wireless communication, such as RFID (e.g., a passive RFID tag, an active RFID tag), cellular, Wi-Fi, Bluetooth, near field communication (NFC), cellular, and the like. In some embodiments, tag 34 is configured to communicate with a mobile application of a smartphone device. In some embodiments, tag 34 is configured to detect or enable detection of a relative proximity of the cover assembly 10 to the external device. In some embodiments, tag 34 is configured with a battery to supply electric power. In other embodiments, a battery is provided in another portion or component of the cover assembly 10.

In some embodiments, identification tag 34 is configured with a microphone 42 and/or speaker 44 (e.g., aural notification device, an aural notification element, an aural indicator, etc., configured to increase aural conspicuity of the cover assembly 10). In some embodiments, the microphone 42 and/or speaker 44 is/are provided in another portion or component of the cover assembly 10. The microphone 42 and/or speaker 44 may be communicably coupled to the microchip or processing circuit as described herein. The microphone 42 can generally be configured to detect sound or noise, which may relate to a particular event, action, voice command, and any other specific noise. For example, the microphone can be configured to detect a clapping noise. In some embodiments, tag 34 is configured to provide audio feedback via the speaker 44 based on one or more input conditions. In another example embodiment, tag 34 may provide audio feedback in response to a command received from a smartphone (e.g., the external device 40). Any type, number, and combination of sound detection via the microphone 42 and/or audio feedback via the speaker 44 may be used according to various alternative embodiments.

In some embodiments, tag 34 provides a repetitive sound, such as a "beep" or pulsing noise via the speaker 44. For example, tag 34 may provide a repetitive sound in response to detecting a clapping noise. In another example embodiment, tag 34 may provide a repetitive sound based on a relative distance to the external device. The frequency of the repetitive sound may be commensurate or otherwise indicative of a relative proximity of the cover assembly 10 to the external device. For example, the frequency of the repetitive sound may increase as a relative distance increases between the cover assembly 10 and the external device. In this regard, the frequency of the repetitive sound may decrease as a relative distance decreases between the cover assembly 10 and the external device. In some embodiments, tag 34 can provide the repetitive sound until a button on the cover assembly 10 is pressed or a user otherwise provides an indication that the cover assembly has been found or is with the user. In some embodiments, tag 34 is provided with one or more light emitting devices (LEDs) 46 (e.g., visual notification devices, visual indicators, visual notification elements, etc.). In some embodiments, tag 34 can operate the LEDs 46 to blink, actuate, change color, pulse, etc., in addition to or separately from the sound provided via the speaker 44. In some embodiments, tag 34 operates the speaker 44 and/or the LEDs 46 as described herein in response to receiving a request or a user input from the external device 40 (e.g., via a wireless signal). Operation of the speaker 44 and LEDs 46 may facilitate locating the remote control 38 by increasing a conspicuity of the remote control 38 and the cover assembly 10 when lost or misplaced.

In some embodiments, tag 34 is configured to detect or enable detection of a relative distance or proximity between the tag 34 and the external device 40 based on communication between the tag 34 and the external device 40. For example, a strength of a signal sent or received by the tag 34 may indicate a relative distance r (e.g., shown as distance 50 in FIG. 2) between the tag 34 and the external device 40. Based on the relative distance r or the strength of the signal, the identification tag 34 can adjust an amplitude (e.g., a sound level), frequency, pitch, etc., or any other aural or sound characteristic of sound emitted by the speaker 44 in real-time or near real-time. For example, as the user (while holding the external device 40) approaches the cover assembly 10 at an unknown location, the amplitude or frequency of sound emitted by the speaker 44 can be increased, thereby aurally notifying the user regarding the relative distance r or proximity. Similarly, the identification tag 34 may operate the LEDs 46 to change actuation frequency, color, etc., based on the strength of the signal to visually notify the user regarding the relative distance r or the proximity. In this way, the identification tag 34 can provide visual and/or aural notifications that change as the user approaches the cover assembly 10 to thereby facilitate locating the cover assembly 10. In some embodiments, the visual and/or aural notifications that change as the user approaches the cover assembly 10 facilitate guiding the user to the location of the cover assembly 10, thereby facilitating finding the cover assembly 10 if lost.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the cover assembly as shown in the various exemplary embodiments is illustrative only. Additionally, any element disclosed in one embodiment may be incorporated or utilized with any other embodiment disclosed herein.

What is claimed is:

1. A cover assembly, comprising:
 a main body defining an interior configured to receive a remote control and including a top portion, a bottom portion, a front portion, a first side portion, a second side portion, and a rear portion;
 a closure member coupled to the rear portion and configured to move the rear portion between an open position, where a remote control is insertable into and removable from the interior, and a closed position, where the closure member is coupled to the bottom portion to secure the remote control within the interior;
a plurality of gripping portions provided on the first and second side portions and configured to facilitate gripping of the cover assembly by a user; and
an identification tag comprising a processor, coupled to the main body, and configured to communicate with an external device and operate to increase a conspicuity of the cover assembly for locating the cover assembly.

2. The cover assembly of claim 1, wherein the main body includes transparent portions configured to overlay at least one of buttons or a display screen on the remote control.

3. The cover assembly of claim 1, wherein the main body is made from an elastic material configured to stretch to accommodate different sized remote controls.

4. The cover assembly of claim 1, wherein the closure member is made from an elastic material and comprises a first end integrally formed with the rear portion and a free end.

5. The cover assembly of claim 4, wherein the closure member includes a fastener at the free end for fastening the free end in the closed position.

6. The cover assembly of claim 1, further comprising at least one visibility strip configured to facilitate locating the cover assembly in low light conditions.

7. The cover assembly of claim 6, wherein the at least one visibility strip is made from phosphorescent material to provide a glow in the dark strip.

8. The cover assembly of claim 6, wherein the at least one visibility strip includes a plurality of visibility strips that extend in a parallel fashion along at least one of the top, first or second sides, or bottom of the cover assembly.

9. The cover assembly of claim 1, wherein the identification tag comprises a passive RFID tag configured to communicate with the external device to detect a proximity between the external device and the cover assembly.

10. The cover assembly of claim 1, wherein the identification tag comprises a microphone and a speaker, wherein the microphone is configured detect an auditory event, and the identification tag is configured to operate the speaker in response to the auditory event detected by the microphone.

11. The cover assembly of claim 10, wherein the identification tag is configured to change operation of the speaker in real-time as a proximity between the identification tag and the external device changes.

12. The cover assembly of claim 11, wherein the identification tag is configured to change a pitch or frequency of sound emitted by the speaker in real-time to aurally notify a user regarding the proximity between the identification tag and the external device.

13. A cover assembly, comprising:
a main body defining an interior configured to receive a remote control;
a closure member coupled to a rear portion of the main body and configured to transition the cover assembly between an open position, where a remote control is insertable into and removable from the interior, and a closed position to secure the remote control within the interior;
at least one of a visual indicator or an aural indicator positioned on the cover assembly, the visual indicator or the aural indicator configured to increase a visual or aural conspicuity of the cover assembly for locating the cover assembly; and
a processor configured to wirelessly communicate with an external device, wherein the processor is configured to operate a speaker to provide a sound with an aural characteristic for locating the cover assembly, wherein the speaker is the aural indicator.

14. The cover assembly of claim 13, wherein the visual indicator comprises at least one of a strip of phosphorescent material that glows in the dark, or a light emitting device (LED) configured to be operated to increase visual conspicuity of the cover assembly for locating the cover assembly.

15. The cover assembly of claim 13, wherein the aural indicator comprises a speaker configured to provide a sound output to increase aural conspicuity of the cover assembly for locating the cover assembly.

16. The cover assembly of claim 13, wherein the aural characteristic comprises at least one of an amplitude, a frequency, or a pitch of the sound, wherein the aural characteristic is adjusted in real-time based on wireless communications between the processor and the external device to provide an aural indication of current proximity between the external device and the cover assembly.

17. The cover assembly of claim 13, further comprising a microphone, wherein the processor is configured to operate the speaker in response to an aural event detected by the microphone, or a user input received at the external device.

18. The cover assembly of claim 17, wherein the aural event comprises a clapping noise.

19. A cover assembly, comprising:
a main body defining an interior configured to receive a remote control and including a top portion, a bottom portion, a front portion, a first side portion, a second side portion, and a rear portion;
a closure member coupled to the rear portion and configured to move between an open position, where the remote control is insertable into and removable from the interior, and a closed position, where the closure member is coupled to the bottom portion to secure the remote control within the interior, the closure member comprising a first end integrally formed with the rear portion, a free end, and a fastener at the free end for fastening the free end in the closed position;
a plurality of gripping portions provided on the first and second side portions and configured to facilitate gripping of the cover assembly by a user; and
at least one visibility strip of phosphorescent material configured to provide a glow in low light conditions to facilitate locating the cover assembly, the at least one visibility strip extending in a parallel direction along at least one of the top portion, the bottom portion, the first side portion, or the second side portion of the main body;
wherein the main body and the closure member are an elastic material configured to stretch to accommodate different sized remote controls; and
wherein the main body includes one or more transparent portions configured to overlay at least one of buttons or a display screen of the remote control.

* * * * *